United States Patent

[11] 3,573,823

[72] Inventor John A. French
    Huntsville, Ala.
[21] Appl. No. 854,844
[22] Filed Sept. 3, 1969
[45] Patented Apr. 6, 1971
[73] Assignee The United States of America as represented by the Secretary of the Army

[54] METHOD AND APPARATUS FOR ALERTING REMOTE PERSONNEL OF AIRCRAFT, LOCATION AND IDENTIFICATION
5 Claims, 1 Drawing Fig.

[52] U.S. Cl................................................. 343/6, 343/6.5
[51] Int. Cl........................................ G01s 7/12, G01s 9/56
[50] Field of Search........................................ 343/6, 6 (A), 6.5

[56] References Cited
UNITED STATES PATENTS
2,691,162 10/1954 Geer............................ 343/6.5
2,961,485 11/1960 Hentschel..................... (343/6A)
3,159,831 12/1964 Muth............................. 343/6.5X Primary Examiner—Rodney D. Bennett, Jr.
Assistant Examiner—Malcolm F. Hubler
Attorneys—Harry M. Saragovitz, Edward J. Kelly, Herbert Berl and Aubrey J. Dunn ABSTRACT: The present invention is directed to the method and apparatus for detecting aircraft, identifying the aircraft as friend or foe, and transmitting alerting signals, the position and identity of the aircraft from a central location to a plurality of remote locations. A radar is used to detect aircraft and identify the aircraft as friend or foe. The position of the aircraft is disclosed on a plan position indicator (PPI). An operator transfers the information (position and identity) on the PPI to a plugboard by placing an appropriate plug in the plugboard to indicate the aircraft as friend or foe and to show the location of the aircraft. The information from the plugboard is encoded and transmitted to a plurality of remote locations. The information received at the remote locations is decoded and displayed such that an operator at the remote location may determine the location and identity of the aircraft detected by the radar.

Patented April 6, 1971
3,573,823
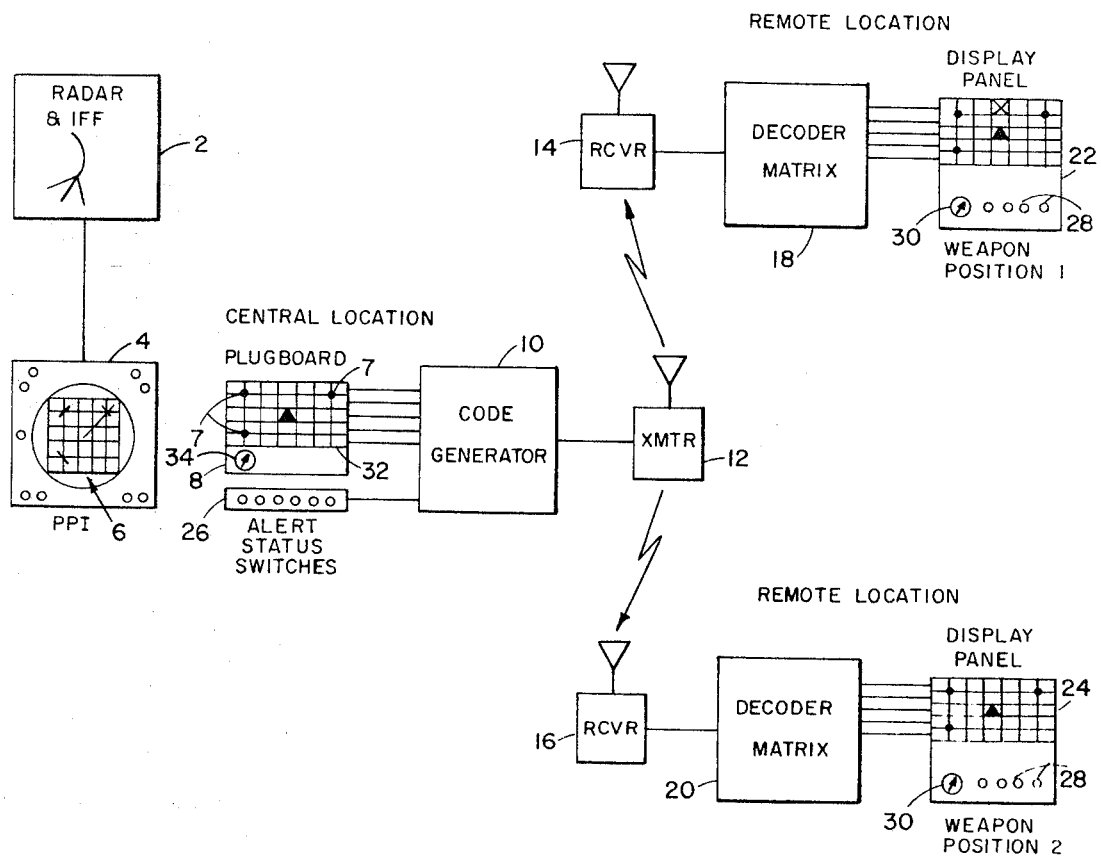
John A. French,
INVENTOR

METHOD AND APPARATUS FOR ALERTING REMOTE PERSONNEL OF AIRCRAFT, LOCATION AND IDENTIFICATION

BACKGROUND OF THE INVENTION

The problem of protecting field military elements against aircraft involves detecting aircraft and identifying the aircraft as friend or foe. Many antiaircraft weapons rely on the capability of operating troops to initially detect aircraft visually or audibly. After the aircraft is detected it must be identified as friendly or hostile before it is fired upon by the troops. Several problems are extant in this manual mode of operation. First, operator fatigue is known to reduce alertness after only a few hours of duty. Second, weather and physical obstructions will reduce operator effectiveness in spotting aircraft. Third, after an aircraft is spotted, it is extremely difficult to determine its identity. Use of profile recognition is largely unsatisfactory because of speeds, profile similarities between enemy and friendly planes, and distances over which identification is desired.

Methods for overcoming these difficulties generally include two categories or methods of using radar and Identification, Friend or Foe (IFF) equipment. These categories suffer from the problems associated with large numbers of sophisticated equipment. The cost of the equipment tends to become prohibitive when the environment of the forward mobile elements of the military is considered. Logistics factors of supply, repair, maintenance, transport, operation, etc., are much worse than, for example, a radar which is located permanently at a military base. One method employs a radar and IFF at each battery, e.g., each gun or guided missile location. This method would approximately double the cost and logistic factors of the battery since a radar is more expensive and difficult to maintain than other battery equipment. A second method would employ a fewer number of centrally located radars which would transmit data to the individual batteries. The seeming economic and logistic advantages of this approach have been largely lost in the past by the sophisticated equipment designs that have been necessary. For example, large radar equipments have required many operators to track aircraft with high precision. Aircraft track data is often inserted into computers and automatically processed. Target returns are compared to IFF returns and individual aircraft are designated as friend or foe. Either by automatic processing or manual calculations, decisions are made to assign targets to specific batteries. Following this, precision high capacity communications are utilized to send the information to batteries. Fire coordination systems of this type have been developed and found to be too expensive and cumbersome to be used for forward military elements.

It is an object of this invention to provide a method and a system whereby aircraft may be detected and identified as friend or foe, and whereby the position and identification of the aircraft may be promptly transmitted to remotely located weapons systems and whereby the operating crews of the weapons systems may be alerted to the presence of the aircraft.

SUMMARY OF THE INVENTION

The present invention is directed to the method and apparatus for detecting aircraft, identifying the aircraft as friend or foe, and transmitting alerting signals position and identity of the aircraft from a central location to a plurality of remote locations. A radar is used to detect aircraft and identify the aircraft as friend or foe. The position of the aircraft is disclosed on a plan position indicator (PPI). An operator transfers the information (position and identity) on the PPI to a plugboard by placing an appropriated plug in the plugboard to indicate the aircraft as friend or foe and to show the location of the aircraft. The information from the plugboard is encoded and transmitted to a plurality of remote locations. The information received at the remote locations is decoded and displayed such that an operator at the remote location may determine the location and identity of the aircraft detected by the radar.

BRIEF DESCRIPTION OF THE DRAWING

The single FIGURE drawing is a schematic diagram of the present invention.

DESCRIPTION OF THE PREFERRED EMBODIMENT

Radar 2 incorporates an Identification, Friend or Foe (IFF) system and provides signals to the Plan Position Indicator (PPI) display oscilloscope 4. A grid overlay 6, or other method of sectoring the PPI scope, divides the area covered by the scope into easily recognizable segments corresponding to map coordinates of the land immediately surrounding the radar. An operator observes target returns and IFF responses on the PPI and determines in which segment of the grid overlay the target or targets are located. A grid-type matrix 32 corresponding to grid overlay 6 is inscribed on plugboard 8. The operator inserts a coded plug 7 into plugboard 8 to indicate aircraft in the position or positions indicated on the PPI. One type coded plug indicates a friend while another type indicates a foe as determined by the IFF response on the PPI. (Other methods or substitutions for the plugboard will work equally well. For example, a matrix of switches would be acceptable.) The identity and location of the aircraft indicated on the plugboard are encoded by code generator 10 and transmitted by transmitter 12 to a plurality of weapon sites. The transmitted information is received by radio receivers 14 and 16 which are located at remote weapon sites. Decoders 18 and 20 translate the data received and initiate display panels 22 and 24. Display panels 22 and 24 may be as a matrix of lights or use of any of a number of other indirect techniques. The remote displays will correspond exactly to plugboard 8 in terms of number, identity and location of targets. Display panels 22 and 24 are oriented by an operator by use of compass 30 to be the same as compass 34 on plugboard 8 and PPI 4. The respective location of the receiving remote weapon position may be indicated on the display panel by an X as shown in the drawing. The radar's location may also be denoted on the display panels by an appropriate symbol, i.e. ▲. The weapon's operator is now collimated with the radar and the broadcast data. Any indication on the display panel will appear at the correct range and bearing as viewed from the weapon site X.

As new targets appear or old targets change position, the radar operator inserts new data via the plugboard and removes the out-of-date plugs. Alarm or alert status switches 26 provide additional inputs to code generator 10 and thereby permit certain commands and conditions to be transmitted to display panels 22 and 24. Lights 28 indicate the positions of the alert status switches 26. (Audible alarms or other methods or substitutions for the lights will work equally well.)

The previous disclosure has dealt with four basic functions: detecting aircraft, identifying aircraft, alerting remote operators, and displaying the position and identity of the aircraft at a remote location. The following disclosure will deal particularly with the fourth function, displaying the position and identity of the aircraft at a remote location. The aircraft's location and identity is determined at a central location. The aircraft's location and identity is then communicated to a plurality of remote locations. Standard radio communications equipment with capability of data transmission may be used to transmit the information from the central location to the remote locations.

Plugboard 8 has a grid system 32 inscribed on its face and is capable of accepting plug-type inserts 7 at each intersection of the grid coordinate system. A hole is provided at the intersection of each of the grid coordinates. As aircraft appear and move across the face of the PPI scope, an operator inserts plugs 7 at the corresponding coordinate position, removing the plugs and reinserting them as the aircraft progresses. The plugs furnish a means of making electrical contact with a code generator matrix on the underside of the plugboard. To identify an aircraft at a particular coordinate the operator simply inserts the appropriate plug to indicate position and identity of the aircraft. Two types of plugs are provided for use in denoting the identity of the aircraft, i.e. red for foe and blue for friend. The plugs are physically different, one being longer than the other to thus provide an additional contact in the plugboard for indicating a foe. As the plug is inserted into the hole, a spring contact (in the case of a foe, two or more contacts) is moved to complete a circuit and thus cause a code corresponding to this pair of grid coordinates to be generated by the code generator. If a longer plug is inserted to indicate a foe, the extra length of the plug would permit the tip of the plug to pass on through the first spring contacts and reach a second layer of contacts in the plugboard and thus cause the code generator to generate a code to indicate the aircraft as a foe. At the center of the plugboard is a representation of the radar location ▲. This location marker may be offset to match any offset of the radar sweep itself with respect to the relative position of the radar.

The conductors from the contacts in the plugboard matrix are connected to code generator 10. A number of wires pass from plugboard 8 to code generator 10, the number being determined by the number of grid intersections provided in the plugboard. The code generator senses the position of the closed contacts on the grid intersection wires and thus the positions having plugs inserted therein. By logical circuitry the signals are encoded by the code generator into a corresponding binary code for that grid position. The code generator also contains a counter which scans all the wires and sends out repetitively the codes for those wires which are energized. The repetition rate for the code groups may be approximately 20 times per second and still allow up to 16 aircraft to be handled within the time frame of the system. A communications-type transmitter with capability of data transmission receives the modulation from the code generator and sends out coordinate positions repetitively. If security measures are required, an additional encoding device may be used prior to transmitting the coded information. Similar techniques can be applied to the alarms or alert status indicator.

There are a number of types of communications equipment which would be suitable for use as the transmitter-receiver link. The transmitter should be capable of both voice and data transmission in order to serve all communication needs. However, if voice communications are not desired, the size and weight of the transmitter and receiver may be appreciably reduced. The principle requirement of the transmitter and receiver is that they be capable of handling data transmission at the data rates required by the system.

The decoder matrix 18 and 20 accepts each grid coordinate code as it comes from receiver 14 and 16, respectively, in sequence. Translation to display panel lamp position is performed in the opposite manner as in the code generator. The output of the decoder matrix corresponds to one of the grid intersections on the display panel. No memory need be provided in the decoder matrix since the coordinate codes are repeated in sequence at the system rate of 20 times per second. The decoder circuits are time shared by all the multiple targets thus reducing the cost and complexity of the system. This type of operation will produce a steady lamp indication at the location of the aircraft. For a flashing indication, indicative of a foe, the code generator at the central location is designed such that the output of the codes for a foe will only occur about four times per second. At this rate, a definite flashing will be visible, contrasted to a steady indication for friendly aircraft produced by use of the shorter plug in plugboard 8.

The display panel may be any lightweight device consisting of a small board with as many lamps inserted as there are intersections of the grid coordinates thereon and likewise on the plugboard. A separate circuit for each lamp passes from the decoder matrix to the panel to light the lamp when the line is energized. Depending on the particular design of the decoder matrix lamp drivers, the lamps may be either neon or incandescent.

I claim:

1. A method for detecting aircraft and identifying the aircraft as friend or foe, and transferring the alerting data, location and identity of the aircraft to a plurality of remote locations comprising the steps of: detecting aircraft with a radar; identifying the aircraft as friend or foe; encoding and transmitting the position and identity and alert status of the aircraft to a plurality of remote locations; receiving said encoded position, identity, and alert status of the aircraft; decoding the received information and displaying the received aircraft position and identity and alert status.

2. A method as set forth in claim 1 wherein the step of encoding the position and identity of the aircraft includes the steps of placing a plug in a plugboard to indicate the position and identity of the aircraft, and encoding the information shown on the plugboard so it may be transmitted.

3. A method as set forth in claim 1 wherein the step of displaying the received position and identity of the aircraft includes the step of lighting a light in a matrix of lights to thereby indicate the position and identity of the aircraft.

4. A device for transfer of information from a first location to a plurality of second locations comprising: a plugboard; a first and second plurality of plugs for insertion in said plugboard; a code generator for encoding the position and identity of said plugs inserted in said plugboard, said first plurality of plugs indicating a friendly aircraft and said second plurality of plugs indicating a foe; means for transmitting said encoded position and identity of said aircraft; means for receiving and decoding said encoded position and identity of said aircraft; means for displaying the decoded information indicating the position and identity of said aircraft.

5. A device as set forth in claim 4 wherein said means for displaying the decoded information comprises a display panel having a matrix of lights thereon, each of said lights being responsive to the position and identity of said plug inserted in said plugboard whereby the position and identity of an aircraft may be ascertained by viewing said display panel.